J. RIDGE.
Improvement in Hubs for Carriage-Wheels.
No. 132,924. Patented Nov. 12, 1872.
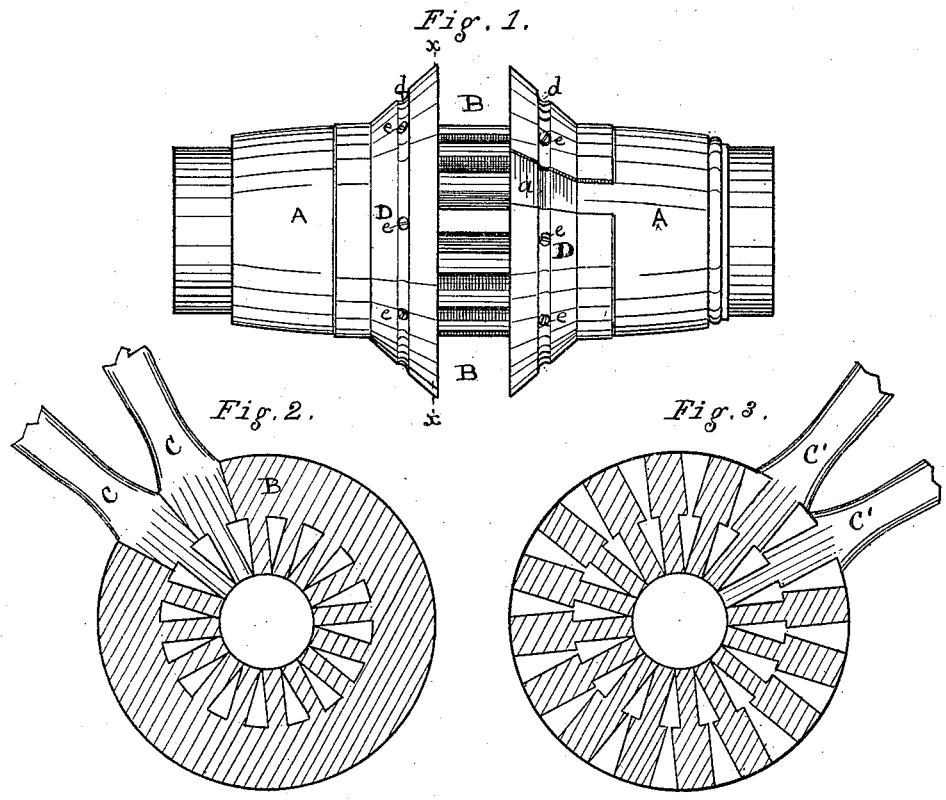

UNITED STATES PATENT OFFICE.

JOSEPH RIDGE, OF RICHMOND, INDIANA.

IMPROVEMENT IN HUBS FOR CARRIAGE-WHEELS.

Specification forming part of Letters Patent No. 132,924, dated November 12, 1872.

*To all whom it may concern:*

Be it known that I, JOSEPH RIDGE, of Richmond, in the county of Wayne and State of Indiana, have invented certain Improvements in Carriage-Wheel Hubs, of which the following is a specification:

My invention relates to improvements in the construction of wooden hubs, and in the method of securing the spokes therein, whereby a much stronger and tougher wheel is produced than by the ordinary wooden hub and metal flanges heretofore in use; and the invention consists in forming the hub with an enlarged center, so as to present an increased thickness at the point where the mortise-holes are cut, thereby permitting of an increased bearing-surface between the spokes and hub, said enlargement having beveled or oblique faces, which begin at or near the spokes, so as to present a flange-like appearance and make a neatly-finished wheel-hub, the flanged portions of which may be protected by light metallic bands made to conform to the shape of the beveled faces, all as hereinafter more fully set forth.

In the accompanying drawing, Figure 1 is an elevation of my improved hub, showing the flange-like enlargement, and with a portion of the light metal band cut away to show its thickness. Fig. 2 is a cross-section of Fig. 1 on the line $x\ x$. Fig. 3 is a cross-section, showing a hub in which the mortise-holes and the tenons of the spokes are extended throughout the entire thickness of the enlarged hub.

In Figs. 1 and 2, A represents the hub, formed with flange-like enlargements $a$, between which a continuous channel or groove, B, is formed for the reception of the spokes C, which shoulder against each other and form a continuous arch down to a line with the hub at the base of the enlarged part; from thence inward the hub is mortised and the spokes tenoned, as shown in Fig. 2 of the drawing. In Fig. 3, instead of the continuous channel or groove B of Figs. 1 and 2 and the continuous arch formed by the spokes above the tenons, the hub is cut with large mortises extending the depth of the channel, and then with the smaller mortises, the same as shown in Fig. 2. The spokes C are formed with double tenons corresponding to the mortise-holes, as plainly shown in the figure. D represents light bands of metal, which are made to conform to shape of the flange-like enlargements of the wooden hub, and extend partially over the hub beyond the base of the enlargements. These bands D serve to protect the enlargements of the hub from injury. They are also made with an annular groove, $d$, pressed or fitted into a corresponding groove formed on the beveled face of the hub, and bolts or rivets $e$ may be used to secure the bands and hub together, the heads of the bolts being seated in the groove $d$, so as to have a bearing at right angles thereto, and being countersunk therein make a neat finish.

It will be seen that the faces of the enlarged central portion of the hub slope downward at an angle of about forty-five degrees, and, having the groove $d$ and the thin metal bands extending onto the horizontal portion of the hub, they present a flange-like appearance, giving a neat finish to the wheel without impairing the strength or elasticity of the wood.

I am aware that wooden hubs having metal flanges corresponding in shape to my flange-like enlargements of the wooden hub have before been invented and are in common use for carriage-wheels, and also that large wooden hubs with correspondingly-deep mortises have been common in cart and wagon wheels.

I do not, therefore, lay any claim to a wheel constructed on either of these principles. My invention is designed to embrace all the advantages of the thickness of the wood and consequent deep mortises and tenons of the latter, with the elegant contour and finish consequent on the former method of construction.

What I claim is—

A hub having an enlarged center, $a$, with faces at an angle of about forty-five degrees, and groove $d$, in combination with the bands D and bolts $e$, the whole constructed in the manner and for the purpose specified.

JOSEPH RIDGE.

Witnesses:
JOHN D. M'CLELLAND,
MELANCTHON F. DARON.